(12) United States Patent
Kim et al.

(10) Patent No.: US 12,278,373 B2
(45) Date of Patent: Apr. 15, 2025

(54) SULFUR-CARBON COMPOSITE, AND CATHODE FOR LITHIUM SECONDARY BATTERY AND LITHIUM SECONDARY BATTERY WHICH COMPRISE SAME

(71) Applicant: LG ENERGY SOLUTION, LTD., Seoul (KR)

(72) Inventors: Soohyun Kim, Daejeon (KR); Bong Soo Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 728 days.

(21) Appl. No.: 17/431,216

(22) PCT Filed: May 29, 2020

(86) PCT No.: PCT/KR2020/006964
§ 371 (c)(1),
(2) Date: Aug. 16, 2021

(87) PCT Pub. No.: WO2020/251199
PCT Pub. Date: Dec. 17, 2020

(65) Prior Publication Data
US 2022/0115662 A1 Apr. 14, 2022

(30) Foreign Application Priority Data
Jun. 14, 2019 (KR) .................. 10-2019-0070378

(51) Int. Cl.
*H01M 4/38* (2006.01)
*H01M 4/04* (2006.01)
(Continued)

(52) U.S. Cl.
CPC ......... *H01M 4/625* (2013.01); *H01M 4/0402* (2013.01); *H01M 4/366* (2013.01);
(Continued)

(58) Field of Classification Search
CPC ................... H01M 2004/021; H01M 4/04024
See application file for complete search history.

(56) References Cited

U.S. PATENT DOCUMENTS 7,250,233 B2 * 7/2007 Choi .................. H01M 10/052
429/231.95
2011/0049432 A1 3/2011 Lee et al.
(Continued)

FOREIGN PATENT DOCUMENTS

CN 102447113 A * 5/2012
CN 109104882 A 12/2018
(Continued)

OTHER PUBLICATIONS

Machine translation of CN-102447113-A from Espacenet May 9, 2012 (Year: 2012).*
(Continued)

Primary Examiner — Maria Laios
Assistant Examiner — Zackary Richard Cochenour
(74) Attorney, Agent, or Firm — Birch, Stewart, Kolasch & Birch, LLP

(57) ABSTRACT

Disclosed is a sulfur-carbon composite including a porous carbon material coated with a thiophene-based polymer doped with a dopant and sulfur on at least a portion of an interior and a surface of the porous carbon material, and a positive electrode for lithium secondary battery, and a lithium secondary battery including the same. Also disclosed is a method for preparation thereof.

13 Claims, 5 Drawing Sheets

(51) Int. Cl.
  *H01M 4/36* (2006.01)
  *H01M 4/58* (2010.01)
  *H01M 4/60* (2006.01)
  *H01M 4/62* (2006.01)
  *H01M 10/052* (2010.01)
  *H01M 10/36* (2010.01)
  *H01M 4/02* (2006.01)

(52) U.S. Cl.
  CPC ........... *H01M 4/38* (2013.01); *H01M 4/5815* (2013.01); *H01M 4/602* (2013.01); *H01M 4/622* (2013.01); *H01M 4/628* (2013.01); *H01M 10/052* (2013.01); *H01M 10/36* (2013.01); *H01M 2004/021* (2013.01)

(56) References Cited

U.S. PATENT DOCUMENTS

| | | | |
|---|---|---|---|
| 2014/0113199 | A1 | 4/2014 | Zhang et al. |
| 2014/0315081 | A1* | 10/2014 | Zhang .................. H01M 4/366 427/560 |
| 2016/0218352 | A1* | 7/2016 | Musameh ......... H01M 10/0569 |
| 2018/0245203 | A1 | 6/2018 | Cho et al. |
| 2018/0301707 | A1 | 10/2018 | Pan et al. |
| 2019/0036114 | A1 | 1/2019 | Matsumoto et al. |
| 2019/0245203 | A1* | 8/2019 | Cho .................. H01M 10/0525 |
| 2021/0119218 | A1 | 4/2021 | Kim |

FOREIGN PATENT DOCUMENTS

| | | |
|---|---|---|
| CN | 109314228 A | 2/2019 |
| CN | 110915049 A | 3/2020 |
| CN | 112470309 A | 3/2021 |
| EP | 3 799 162 A1 | 3/2021 |
| KR | 10-2002-0034723 A | 5/2002 |
| KR | 10-2009-0079820 A | 7/2009 |
| KR | 10-2014-0039692 A | 4/2014 |
| KR | 10-2014-0119250 A | 10/2014 |
| KR | 10-2016-0078334 A | 7/2016 |
| KR | 10-2016-0134092 A | 11/2016 |
| KR | 10-2018-0017975 A | 2/2018 |
| KR | 20180017975 A * | 2/2018 |
| KR | 20180048309 A * | 5/2018 |
| KR | 10-2018-0071108 A | 6/2018 |
| WO | WO 2012/168976 A1 | 10/2017 |
| WO | WO 2018/084449 A2 | 5/2018 |
| WO | WO-2019004220 A1 * | 1/2019 .......... H01M 10/054 |

OTHER PUBLICATIONS

Machine translation of KR-20180017975-A from Espacenet Feb. 21, 2018 (Year: 2018).*

Machine translation of WO 2019004220 A1 from PE2E (Year: 2019).*

Extended European Search Report for European Application No. 20823154.8, dated Feb. 23, 2022.

Yang et al., "Improving the Performance of Lithium-Sulfur Batteries by Conductive Polymer Coating", American Chemical Society ,vol. 5, No. 11, Nov. 22, 2011 (Published online Oct. 13, 2011), pp. 9187-9193.

Fu et al., "Enhanced Cyclability of Lithium-Sulfur Batteries by a Polymer Acid-Doped Polypyrrole Mixed Ionic-Electronic Conductor," Chemistry of Materials, vol. 24, 2012, pp. 3081-3087.

International Search Report (PCT/ISA/210) issued in PCT/KR2020/006964, dated Sep. 10, 2020.

Jin el al., "Conducting polymer-coated MIL-101/S composite with scale-like shell structure for improving Li—S batteries," RSC Adv., vol. 8, 2018, pp. 4786-4793.

Lee et al., "Surface Modification of Sulfur Cathodes with PEDOT:PSS Conducting Polymer in Lithium-Sulfur Batteries," Journal of the Electrochemical Society, vol. 162, No. 6, 2015, pp. A935-A939.

Li et al., "Improving the performance of PEDOT-PSS coated sulfur@activated porous graphene composite cathodes for lithium-sulfur batteries," Journal of Materials Chemistry A, vol. 2, 2014, pp. 18345-18352.

Wang et al., "Enhancement of Conductivity and Thermoelectric Property of PEDOT:PSS via Acid Doping and Single Post-Treatment for Flexible Power Generator," Advanced Sustainable Systems, 1800085, 2018, pp. 1-9.

Zhou et al., "Polydopamine-Coated, Nitrogen-Doped, Hollow Carbon-Sulfur Double-Layered Core Shell Structure for Improving Lithium-Sulfur Batteries," Nano Letters, vol. 14, 2014, pp. 5250-5256.

* cited by examiner

【Figure 1】
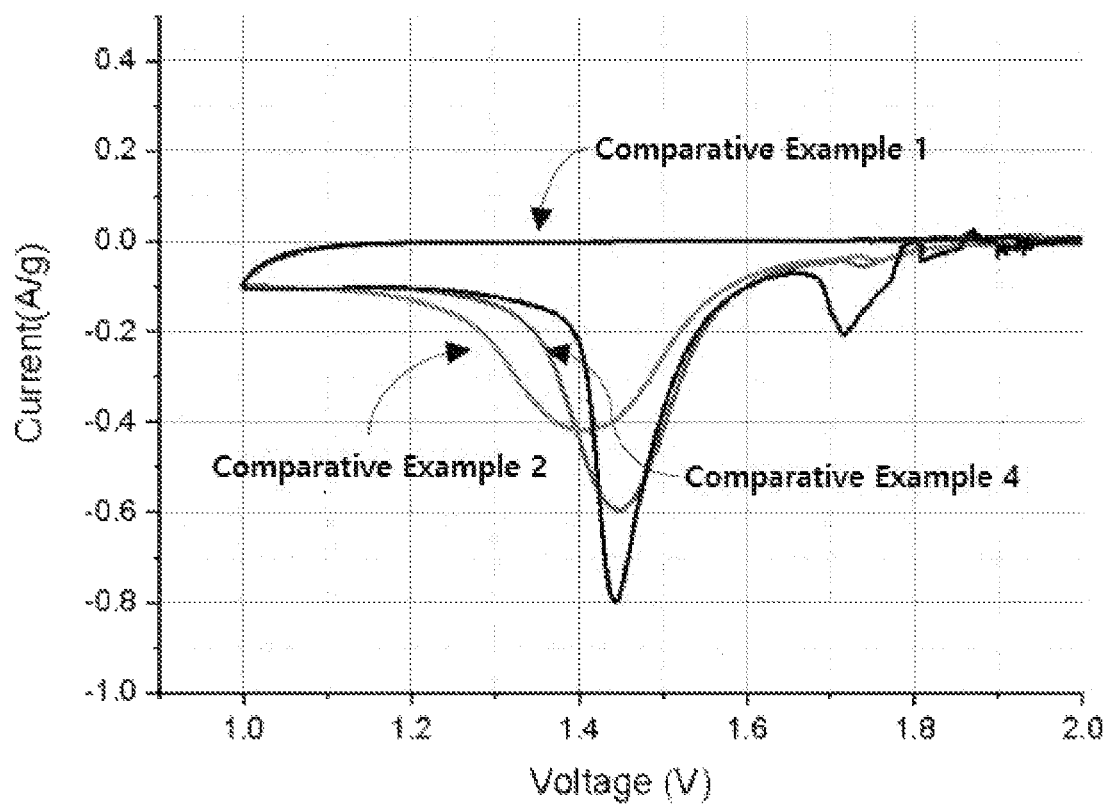

[Figure 2]
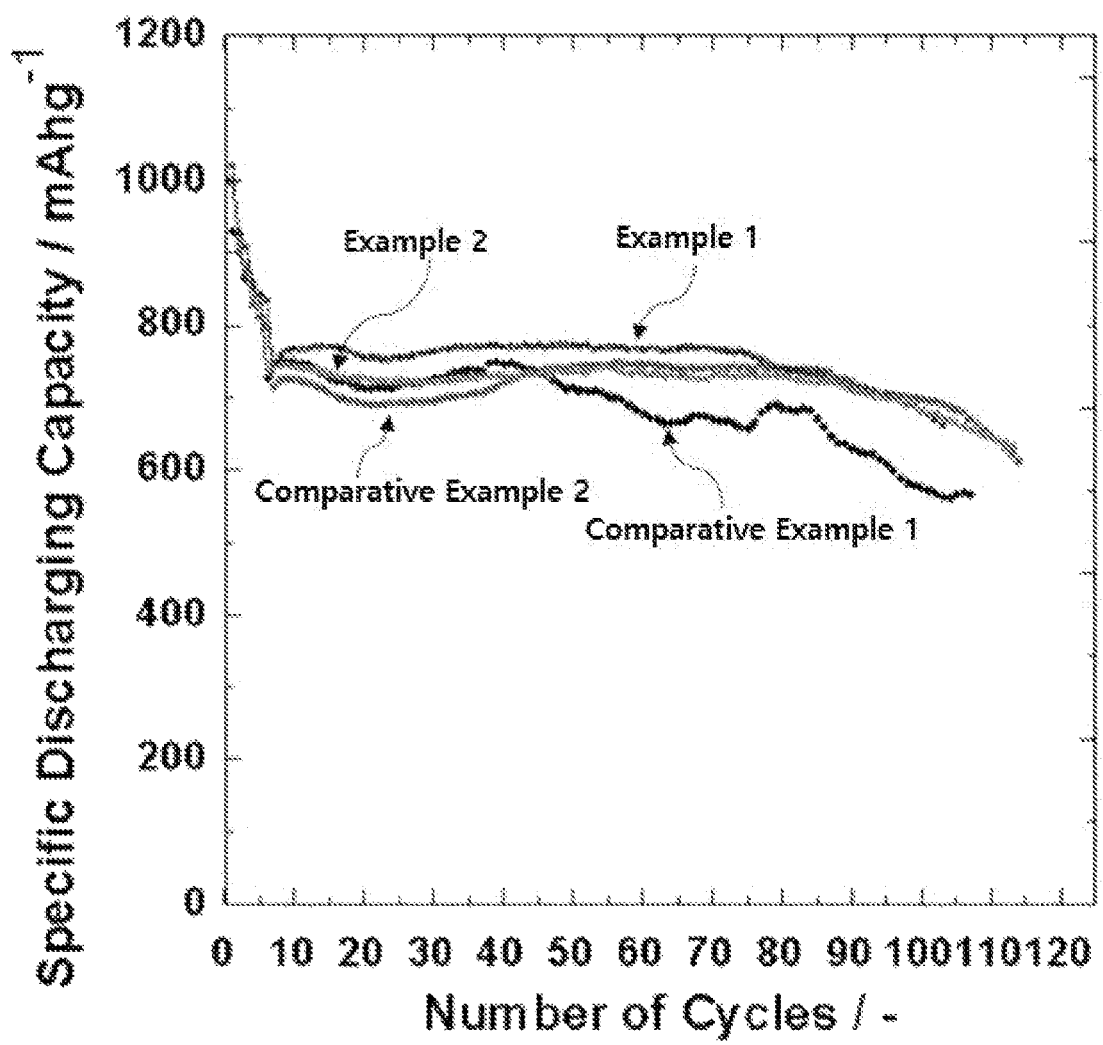

【Figure 3】
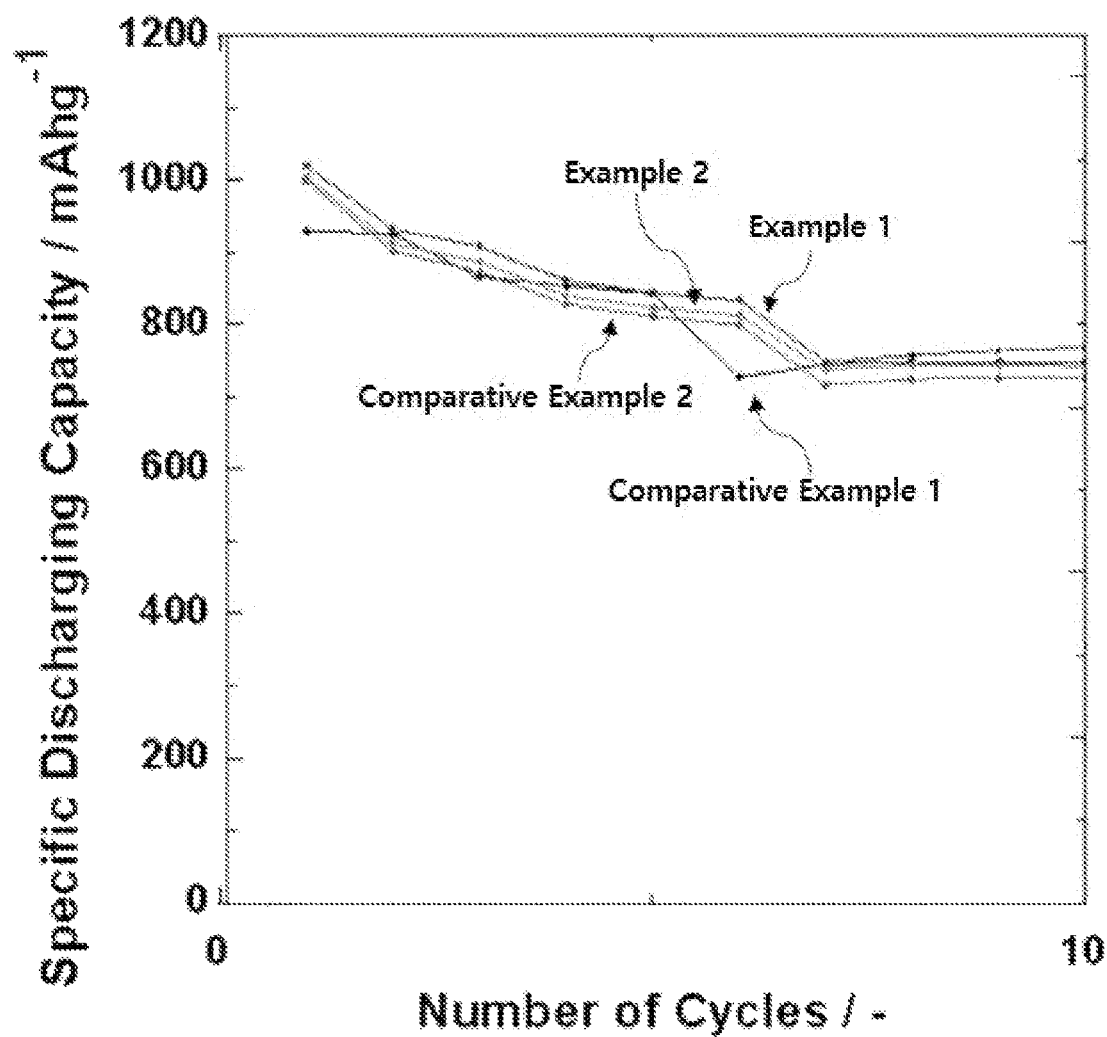

[Figure 4]
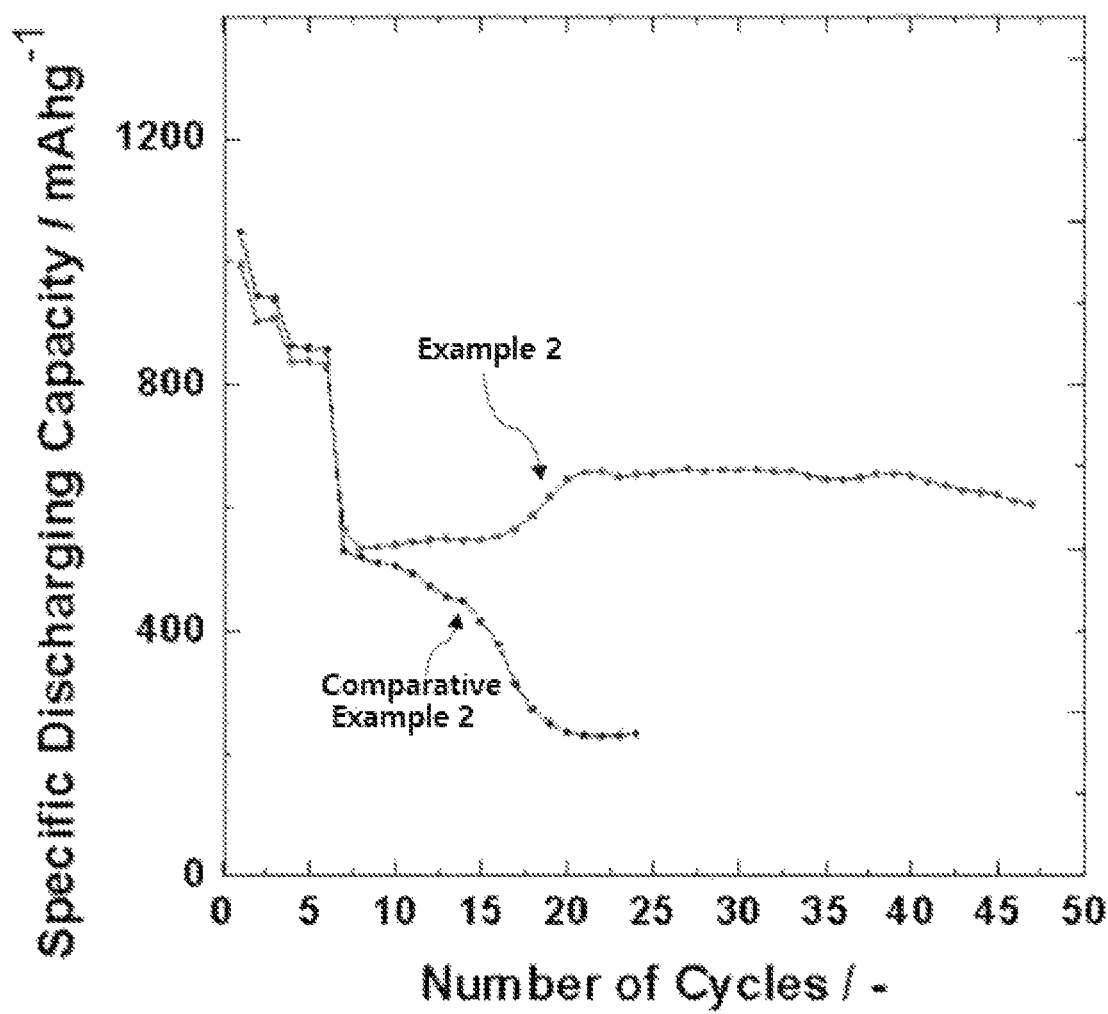

【Figure 5】
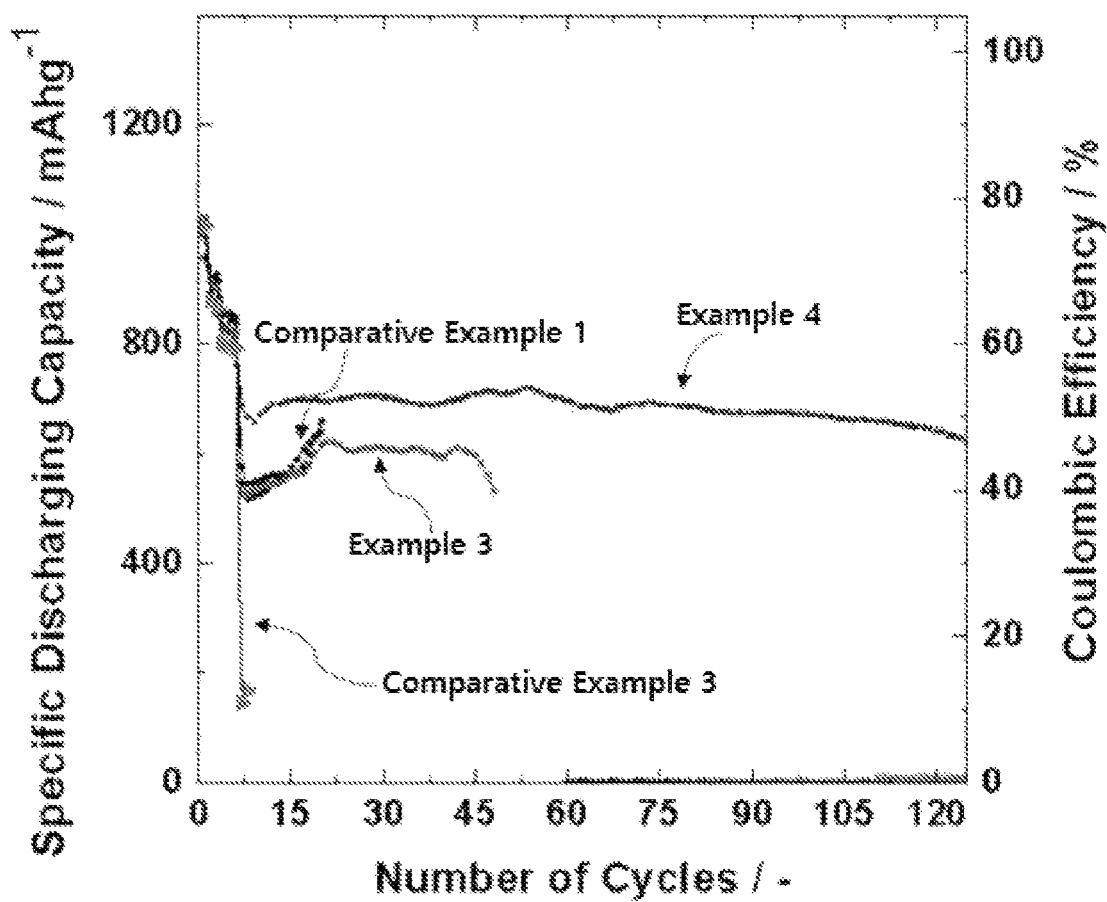

SULFUR-CARBON COMPOSITE, AND CATHODE FOR LITHIUM SECONDARY BATTERY AND LITHIUM SECONDARY BATTERY WHICH COMPRISE SAME

TECHNICAL FIELD

The present application claims the benefit of priority based on Korean Patent Application No. 10-2019-0070378 filed on Jun. 14, 2019, the entire contents of which are incorporated herein by reference.

The present invention relates to a sulfur-carbon composite, a positive electrode for lithium secondary battery and a lithium secondary battery comprising the same.

BACKGROUND ART

Recently, there is increasing interest in energy storage technology. As the application area thereof extends to the energy for mobile phones, camcorders, notebook PCs, and even electric vehicles, the effort of research and development of electrochemical devices is being carried out more and more concretely.

Electrochemical devices are the most noteworthy area in this respect, and among them, the development of a secondary battery capable of charging/discharging is the focus of attention. Recently, in developing these batteries, research and development on the design of new electrodes and batteries have been conducted in order to improve capacity density and energy efficiency.

Among the secondary batteries currently being applied, the lithium secondary batteries developed in the early 1990s are attracting much attention as there is an advantage in that it has much higher operating voltage and energy density than conventional batteries such as Ni—MH, Ni—Cd, and sulfuric acid-lead batteries using an electrolyte solution in the form of an aqueous solution.

In particular, the lithium-sulfur (Li—S) battery is a secondary battery using a sulfur-based material having an S—S bond (sulfur-sulfur bond) as a positive electrode active material and using lithium metal as a negative electrode active material. The Lithium-sulfur battery has advantages in that sulfur, which is the main material of the positive electrode active material, is very rich in resources, is not toxic, and has a low atomic weight. In addition, theoretical discharge capacity of the lithium-sulfur battery is 1675 mAh/g-sulfur, and its theoretical energy density is 2600 Wh/kg. Since the energy density of the lithium-sulfur battery is much higher than the theoretical energy density of other battery systems currently under study (Ni-MH battery: 450 Wh/kg, Li—FeS battery: 480 Wh/kg, Li—$MnO_2$ battery: 1000 Wh/kg, Na—S battery: 800 Wh/kg), the lithium-sulfur battery is the most promising battery among the batteries developed so far.

During the discharging of the lithium-sulfur battery, an oxidation reaction of lithium occurs at the negative electrode and a reduction reaction of sulfur occurs at the positive electrode. Sulfur before discharging has an annular $S_8$ structure. During the reduction reaction (discharging), as the S—S bond is cut off, the oxidation number of S decreases, and during the oxidation reaction (charging), as the S—S bond is re-formed, the oxidation number of S increases. Electrical energy is stored and generated using the oxidation-reduction reaction as described above. During these reactions, the sulfur is converted from the cyclic $S_8$ structure to the linear structure of lithium polysulfide ($Li_2S_x$, x=8, 6, 4, 2) by the reduction reaction and eventually, when the lithium polysulfide is completely reduced, lithium sulfide ($Li_2S$) is finally produced. By the process of reducing to each lithium polysulfide, the discharging behavior of the lithium-sulfur battery is characterized by exhibiting a step-wise discharge voltage unlike lithium ion battery.

However, in the case of such a lithium-sulfur battery, there is a problem that commercialization is difficult due to low lifetime characteristics.

This can be attributed to the fact that lithium polysulfide (LPS) leached from the positive electrode moves to the negative electrode, causing a side reaction directly on the surface of the negative electrode, thereby reducing the capacity of the battery and shortening the lifetime. Another reason may be the fact that the electrolyte solution is decomposed on the surface of the porous carbon material, which is a positive electrode active material, and accordingly, the lifetime is shortened due to the depletion of the electrolyte solution.

Currently, many studies have been conducted-on-the-inhibition to prevent the leaching of lithium polysulfide, but studies to prevent the decomposition reaction of the electrolyte solution are still insufficient.

Therefore, there is a need for research to improve the lifetime characteristics of lithium-sulfur batteries by preventing decomposition of the electrolyte solution.

PRIOR ART DOCUMENT

Patent Document

Korean Laid-open Patent Publication No. 10-2016-0134092

DISCLOSURE

Technical Problem

In the case of lithium-sulfur batteries among lithium secondary batteries, there is a problem that the electrolyte solution is decomposed on the surface of the porous carbon material of sulfur-carbon composite used as a positive electrode active material and thus the lifetime of a lithium-sulfur battery decreases due to the depletion of electrolyte solution.

As a result of carrying out various studies to solve the above problems, the inventors of the present invention have confirmed that if the surface of the porous carbon material of the sulfur-carbon composite is coated with a thiophene-based polymer doped with a dopant, since the decomposition of the electrolyte solution can be prevented, the lifetime characteristics of the lithium-sulfur battery comprising the sulfur-carbon composite can be improved, and thus have completed the present invention.

Therefore, it is an object of the present invention to provide a sulfur-carbon composite capable of preventing the decomposition of the electrolyte solution.

In addition, it is still an object of the present invention to provide a positive electrode for a lithium secondary battery comprising the sulfur-carbon composite and a lithium secondary battery comprising the positive electrode.

Technical Solution

In order to achieve the above objects, the present invention provides a sulfur-carbon composite containing a porous carbon material and sulfur contained in at least a portion of the interior and surface of the porous carbon material, wherein the surface of the porous carbon material is coated with a thiophene-based polymer doped with a dopant.

In addition, the present invention provides a method for preparing a sulfur-carbon composite comprising the steps of,
(a) coating a porous carbon material with a thiophene-based polymer doped with a dopant; and
(b) mixing and molding the porous carbon material coated with a thiophene-based polymer doped with a dopant prepared in step (a) and sulfur, In addition, the present invention provides a positive electrode for a lithium secondary battery comprising the sulfur-carbon composite of the present invention.

In addition, the present invention provides a lithium secondary battery comprising a positive electrode, a negative electrode, a separator interposed between the positive electrode and the negative electrode, and an electrolyte solution, wherein the positive electrode is the positive electrode of the present invention.

Advantageous Effects

The sulfur-carbon composite of the present invention can prevent decomposition of the electrolyte solution, thereby improving the reactivity and lifetime characteristics of the lithium-sulfur battery, since the surface of porous carbon material is coated with a thiophene-based polymer doped with a dopant.

DESCRIPTION OF DRAWINGS

FIG. 1 is a graph by cyclic voltammetry of sulfur-carbon composites of Comparative Examples 1, 2 and 4.

FIG. 2 is a graph obtained by measuring lifetime characteristics of Example 1, Example 2, Comparative Example 1 and Comparative Example 2.

FIG. 3 is a graph obtained by measuring the reactivity of the initial cycles of Example 1, Example 2, Comparative Example 1 and Comparative Example 2.

FIG. 4 is a graph obtained by measuring lifetime characteristics in high-rate sections of Example 2 and Comparative Example 2.

FIG. 5 is a graph obtained by measuring lifetime characteristics of Example 3, Example 4, Comparative Example 1 and Comparative Example 3.

BEST MODE

Hereinafter, the present invention will be described in more detail.

The term "composite" as used herein refers to a material that two or more materials are combined to express a more effective function while forming physically and chemically different phases from each other.

In the case of a lithium secondary battery, especially a lithium-sulfur battery, the decomposition of the electrolyte solution occurs on the surface of the porous carbon material of the sulfur-carbon composite, which is a positive electrode active material, and more specifically, since sulfur is first decomposed, the decomposition of the electrolyte solution occurs in the porous carbon material left after decomposition of sulfur. Due to decomposition of the electrolyte solution, the electrolyte solution is depleted, and accordingly, there is a problem in that the lifetime of the lithium-sulfur battery decreases.

Therefore, the present invention is to provide a sulfur-carbon composite that can solve the above problems.

Sulfur-Carbon Composite

The present invention relates to a sulfur-carbon composite comprising a porous carbon material and sulfur contained in at least a portion of the interior and surface of the porous carbon material, wherein the surface of the porous carbon material is coated with a thiophene-based polymer doped with a dopant.

In the present invention, as the surface of the porous carbon material is coated with a thiophene-based polymer doped with a dopant, the phenomenon that the electrolyte solution decomposes on the surface of the porous carbon material can be prevented, thereby improving the problem of reducing the lifetime of the lithium secondary battery due to depletion of the electrolyte solution and improving reactivity.

The porous carbon material may have a porous structure or a high specific surface area, and may be any of those conventionally used in the art. The porous carbon material may preferably comprise at least one selected from the group consisting of graphite, graphene, carbon black, carbon nanotubes, carbon fibers, and activated carbon, and preferably carbon nanotubes.

The polymer coated on the surface of the porous carbon material is a conductive polymer, and in the present invention, a thiophene-based polymer doped with a dopant is coated on the surface of the porous carbon material.

The thiophene-based polymer is the most preferable because it is an aqueous conductive polymer and can coat the surface of the porous carbon material even in a small amount.

The thiophene-based polymer is not particularly limited in terms of its kind, but may preferably comprise at least one selected from the group consisting of poly(3,4-ethylenedioxythiophene) polystyrene sulfonate (PEDOT:PSS) and poly(3-hexylthiophene).

The poly(3,4-ethylenedioxythiophene) polystyrene sulfonate is a polymer obtained by dispersing poly(3,4-ethylenedioxythiophene) with low solubility in water or organic solvents by using polystyrene sulfonate with high solubility in water. The poly(3,4-ethylenedioxythiophene) polystyrene sulfonate may improve lithium ion conductivity by the sulfone group of the polystyrene sulfonate, and also serve as a dopant to improve electron conductivity. In addition, the poly(3,4-ethylenedioxythiophene) polystyrene sulfonate is easily mixed with a volatile solvent and is most effective in preventing the decomposition of the electrolyte solution. Therefore, it is most preferable to use poly(3,4-ethylenedioxythiophene) polystyrene sulfonate among thiophene-based polymers.

In addition, the dopant may comprise at least one selected from the group consisting of sulfuric acid, para-toluene sulfonic acid, perchloric acid, hydrochloric acid, fluoroboric acid and phosphoric acid, and preferably may comprise at least one selected from the group consisting of sulfuric acid and para-toluene sulfonic acid.

By doping the thiophene-based polymer with a dopant, electrical conductivity can be improved, thereby providing a lithium secondary battery, preferably a lithium-sulfur battery, having excellent lifetime characteristics and reactivity.

In general, when the charges of the positive charge and the negative charge are the same, the electron conductivity decreases due to the stability of the charge. When doped with a dopant, since the electrical conductivity is improved due to the imbalance between the positive charge and the negative charge, the overvoltage of the battery can be reduced, and the side reaction can be reduced by reducing the reaction time between lithium and the positive electrode active material. In addition, c-rate characteristics can be improved as the reaction time decreases. From this, it is possible to provide a lithium secondary battery, preferably a lithium-sulfur battery, having excellent lifetime characteristics and reactivity.

The dopant is contained in an amount of 0.01 to 10 parts by weight, preferably 0.01 to 1 part by weight based on 100 parts by weight of the thiophene-based polymer.

If the dopant is less than 0.01 part by weight, the effect of improving the electron conductivity due to the dopant is insufficient. If the dopant exceeds 10 parts by weight, the electrical conductivity may be reduced by rather disturbing the imbalance of charge.

The pH of the thiophene-based polymer doped with a dopant may be 2 to 7, preferably pH 4 to 6. If the pH is out of the range, there is a problem that the electron conductivity decreases, and problems such as electrode corrosion may occur in strong acids or strong bases.

Since the sulfur-carbon composite has a structure in which carbon particles are contained inside and outside of the sulfur particles, there is an advantage that sulfur and carbon can be mixed in a uniform ratio, so that carbon, which is an electrically conductive material, can effectively impart electron conductivity to sulfur.

The sulfur may comprise at least one selected from the group consisting of sulfur ($S_8$), $Li_2S_n$ ($n \geq 1$), an organic sulfur compound, and a carbon-sulfur polymer [$(C_2S_x)_n$:x=2.5 to 50, $n \geq 2$].

In addition, the diameter of the sulfur-carbon composite 11 may be 5 to 100 μm, preferably 10 to 70 μm, more preferably 15 to 60 μm. In this case, the diameter of the sulfur-carbon composite 11 refers to the length of the longest axis in the cross section of the particle. If the diameter of the sulfur-carbon composite is less than 5 μm, the porosity of the electrode is very low, and the reactivity of the electrode decreases. If the diameter of the sulfur-carbon composite exceeds 100 μm, the degree of non-uniformity during electrode formation increases, which may cause problems such as occurrence of short circuit and increase in porosity.

The weight ratio of the sulfur and the porous carbon material coated with a thiophene-based polymer doped with a dopant may be 60:40 to 90:10, preferably 65:35 to 85:15, more preferably 70:30 to 80:20. If the weight ratio of the porous carbon material to the sulfur is less than the above range, conductivity may be deteriorated. If the weight ratio of the porous carbon material to the sulfur exceeds the above range, the amount of the active material may decrease and energy density may decrease.

Preparing Method of Sulfur-Carbon Composite

In addition, the present invention relates to a method for preparing a sulfur-carbon composite comprising the steps of,
(a) coating a porous carbon material with a thiophene-based polymer doped with a dopant; and
(b) mixing and molding the porous carbon material coated with a thiophene-based polymer doped with a dopant prepared in step (a) and sulfur.

Step (a) is a step of coating a porous carbon material with a thiophene-based polymer doped with a dopant.

The dopant, thiophene-based polymer and porous carbon material are the same as described above.

The coating is not particularly limited as long as it is a coating method used to form a coating layer in the art, and may be formed by a wet coating method, a dropcast method, a dip-coating method, a blade coating method, a spray coating method, a meyer bar coating method or a vacuum filter method.

When a solvent is required for the coating, water, or organic solvents such as ethanol, acetone, isopropyl acetate (IPA), tetrahydrofuran (THF), methylene chlorine (MC), dimethylformamide (DMF), dimethyl sulfoxide (DMSO) and dimethylacetamide (DMAc) and the like can be illustrated.

In addition, when coating the surface of the porous carbon material with the thiophene-based polymer doped with a dopant, the bonding at the interface of the coating layer comprising the copolymer and the porous carbon material is made by a reaction (bonding by π-π interaction) between the copolymer and carbon. At this time, the reaction can be carried out for 1 to 24 hours at room temperature to 100° C., preferably 40 to 70° C.

Step (b) is a step of preparing a sulfur-carbon composite by mixing and molding a porous carbon material coated with a thiophene-based polymer doped with a dopant prepared in step (a) and sulfur.

The process of mixing and molding sulfur may be any method as long as it is a method known in the art.

The mixing is to increase the mixing degree between the above-described materials, and may be performed using a stirring device commonly used in the art. At this time, the mixing time and speed may also be selectively adjusted depending on the content and conditions of the raw materials.

The heating temperature may be any temperature, at which sulfur is melted, and specifically may be 120 to 180° C., preferably 150 to 180° C. If the heating temperature is less than 120° C., the structure of the sulfur-carbon composite may not be properly formed because sulfur is not sufficiently melted. If the heating temperature exceeds 180° C., it is difficult to obtain the desired effect because the coated compound does not remain. In addition, the heating time can be adjusted depending on the content of sulfur.

Through step (b), sulfur-carbon composite can be prepared, and the porous carbon material is coated with a thiophene-based polymer doped with a dopant on the surface.

Positive Electrode for Lithium Secondary Battery

In addition, the present invention relates to a positive electrode for a lithium secondary battery comprising the sulfur-carbon composite of the present invention described above, preferably to a positive electrode for a lithium-sulfur battery. The sulfur-carbon composite is a positive electrode active material.

The positive electrode may comprise a positive electrode current collector and a positive electrode active material layer on the positive electrode current collector, and the positive electrode active material layer may comprise a positive electrode active material and optionally an electrically conductive material and a binder.

The electrically conductive material may be comprised for the purpose of smoothly moving electrons within the positive electrode together with the positive electrode active material, and the binder may be comprised for the purpose of increasing the adhesion force between positive electrode active materials or between the positive electrode active material and the current collector.

The positive electrode current collector generally can be made in a thickness of 3 to 500 μm and is not particularly limited as long as it has high electrical conductivity without causing chemical changes in the battery. For example, an electrically conductive metal such as stainless steel, aluminum, copper, or titanium, etc., can be used as the positive electrode current collector, and preferably an aluminum current collector can be used. The positive electrode current collector may be formed in various forms such as film, sheet, foil, net, porous body, foam, or nonwoven fabric.

The electrically conductive material may be carbon-based materials such as carbon black, acetylene black, and Ketjen black; a conductive polymer such as polyaniline, polythiophene, polyacetylene, polypyrrole and may be preferably comprised in an amount of 5 to 20 wt. % based on the total weight of the positive electrode active material layer. If the content of the electrically conductive material is less than 5 wt. %, the effect of improving the electrical conductivity by the use of the electrically conductive material is insignificant. On the other hand, if the content of the electrically conductive material exceeds 20 wt. %, the content of the positive electrode active material becomes relatively small, and thus there is a possibility that the capacity characteristics may be deteriorated.

In addition, the binder may be poly(vinyl acetate), polyvinylalcohol, polyethyleneoxide, polyvinylpyrrolidone, alkylated polyethyleneoxide, cross-linked polyethyleneoxide, polyvinylether, poly(methylmethacrylate), polyvinylidene fluoride, copolymer of polyhexafluoropropylene and polyvinylidene fluoride (product name: Kynar), poly(ethylacrylate), polytetrafluoroethylene, polyvinylchloride, polyacrylonitrile, polyvinylpyridine, polystyrene, and derivatives, blends and copolymers thereof and the like. Also, the binder may be preferably comprised in an amount of 5 to 20 wt. % based on the total weight of the positive electrode active material layer. If the content of the binder is less than 5 wt. %, the effect of improving the adhesion force between the positive electrode active materials or between the positive electrode active material and the current collector depending on the use of the binder is insufficient. On the other hand, if the content of the binder exceeds 20 wt. %, the content of the positive electrode active material becomes relatively small, and thus there is a possibility that the capacity characteristics may be deteriorated.

The positive electrode as described above may be manufactured by a conventional method, and specifically, can be manufactured by applying the composition for forming the positive electrode active material layer prepared by mixing the positive electrode active material, the electrically conductive material and the binder in an organic solvent or water, on a current collector, followed by drying and optionally rolling.

At this time, the organic solvent may be a solvent which can uniformly disperse the positive electrode active material, the binder, and the electrically conductive material, and which is easily evaporated. Specifically, the organic solvent may comprise acetonitrile, methanol, ethanol, tetrahydrofuran, isopropyl alcohol and the like.

Lithium Secondary Battery

The present invention relates to a lithium secondary battery comprising a positive electrode, a negative electrode, a separator interposed between the positive electrode and the negative electrode, and an electrolyte solution, wherein the positive electrode is the positive electrode of the present invention described above.

The lithium secondary battery may be preferably a lithium-sulfur battery.

The negative electrode may be composed of a current collector and a negative electrode active material layer formed on one or both surfaces thereof. In addition, the negative electrode may be a lithium metal plate.

The current collector is for supporting a negative electrode active material and is not particularly limited as long as it is electrochemically stable in the voltage range of the lithium secondary battery while having excellent electrical conductivity. For example, copper, stainless steel, aluminum, nickel, titanium, palladium, sintered carbon; copper or stainless steel surface-treated with carbon, nickel, silver or the like; aluminum-cadmium alloy or the like may be used as the current collector.

The negative electrode current collector can enhance the bonding force with the negative electrode active material by having fine irregularities formed on its surface, and may be formed in various forms such as film, sheet, foil, mesh, net, porous body, foam, or nonwoven fabric.

The negative electrode active material may comprise a material capable of reversibly intercalating or deintercalating lithium ion, a material capable of reversibly forming lithium containing compounds by reacting with lithium ion, or lithium metal or lithium alloy.

The material capable of reversibly intercalating or deintercalating lithium ion can be, for example, crystalline carbon, amorphous carbon, or a mixture thereof.

The material capable of reacting with lithium ion to reversibly form lithium containing compounds may be, for example, tin oxide, titanium nitrate, or silicon.

The lithium alloy may be, for example, an alloy of lithium (Li) and a metal selected from the group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al), and tin (Sn).

A separator is additionally comprised between the positive electrode and the negative electrode. The separator separates or insulates the positive electrode and the negative electrode from each other, and enables transport of lithium ions between the positive electrode and the negative electrode, and may be made of a porous nonconductive or insulating material. Such a separator may be an independent member such as a film and may be a coating layer added to the positive electrode and/or the negative electrode.

Materials forming the separator comprise, but are not limited to, for example, polyolefins such as polyethylene and polypropylene, glass fiber filter papers, and ceramic materials, the thickness of which may be about 5 to about 50 µm, preferably about 5 to about 25 µm.

The electrolyte solution is composed of a lithium salt and an electrolyte solution as a non-aqueous electrolyte containing a lithium salt. Non-aqueous organic solvent, organic solid electrolyte, and inorganic solid electrolyte, etc., are used as the electrolyte solution.

The lithium salt is not particularly limited as long as it can be conventionally used in electrolyte solution for a lithium secondary battery, preferably a lithium-sulfur battery. For example, at least one selected from the group consisting of LiSCN, LiBr, LiI, $LiPF_6$, $LiBF_4$, $LiB_{10}Cl_{10}$, $LiSO_3CF_3$, LiCl, $LiClO_4$, Li $SO_3CH_3$, $LiB(Ph)_4$, $LiC(SO_2CF_3)_3$, $LiN(SO_2CF_3)_2$, $LiCF_3CO_2$, $LiAsF_6$, $LiSbF_6$, $LiAlCl_4$, LiFSI, lithium chloroborane, lithium lower aliphatic carbonate, etc. can be used.

In addition, the concentration of the lithium salt in the electrolyte solution may be 0.2 to 2 M, specifically 0.6 to 2 M, more specifically, 0.7 to 1.7 M. If the concentration of the lithium salt is less than 0.2 M, the conductivity of the electrolyte solution may be lowered and thus the performance of the electrolyte solution may be deteriorated. If the concentration of the lithium salt exceeds 2 M, the viscosity of the electrolyte solution may increase and thus the mobility of the lithium ion may be reduced.

The non-aqueous organic solvent should dissolve the lithium salt well, and the non-aqueous organic solvent of the present invention may comprise, for example, aprotic organic solvents such as N-methyl-2-pyrrolidinone, propylene carbonate, ethylene carbonate, butylene carbonate, dimethyl carbonate, diethyl carbonate, ethyl methyl carbonate, gamma-butyrolactone, 1,2-dimethoxyethane, 1,2-diethoxyethane, tetrahydrofuran, 2-methyl tetrahydrofuran, dimethylsulfoxide, 1,3-dioxolane, 4-methyl-1,3-dioxane diethylether, formamide, dimethylformamide, dioxolane, acetonitrile, nitromethane, methyl formate, methyl acetate, triester phosphate, trimethoxymethane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate, and these organic solvents can be used alone or in a mixed solvent form of two or more solvents thereof.

As the organic solid electrolyte, for example, polyethylene derivatives, polyethylene oxide derivatives, polypropylene oxide derivatives, phosphate ester polymers, polyalginate lysine, polyester sulfide, polyvinyl alcohol, polyvinylidene fluoride, and polymers comprising ionic dissociation groups and the like can be used.

As the inorganic solid electrolyte, for example, nitrides, halides, sulfates and the like of Li such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, $Li_3PO_4$—$Li_2s$-$SiS_2$ may be used.

To the electrolyte of the present invention, for example, pyridine, triethylphosphite, triethanolamine, cyclic ether, ethylene diamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salt, pyrrole, 2-methoxy ethanol, or aluminum trichloride, etc. may also be added for the purpose of improving charging/discharging characteristics, flame retardancy, and the like. In some cases, a halogen-containing solvent such as carbon tetrachloride, ethylene trifluoride or the like can be also added for the purpose of imparting nonflammability, and carbon dioxide gas can be further comprised for the purpose of improving storage characteristics at a high temperature, and FEC (fluoro-ethylene carbonate), PRS (propene sultone), FPC (fluoro-propylene carbonate) and the like can be further comprised.

The electrolyte may be used as a liquid electrolyte or also as an electrolyte separator form in a solid state. When used as a liquid electrolyte, a separator made of porous glass, plastic, ceramic, or polymer is further comprised as a physical separator having a function of physically separating the electrode.

The lithium secondary battery, preferably the lithium-sulfur battery, of the present invention comprises the sulfur-carbon composite of the present invention as a positive electrode active material. As the surface of the porous carbon material of the sulfur-carbon composite is coated with a thiophene-based polymer doped with a dopant, it is possible to prevent the phenomenon that the electrolyte solution is decomposed on the surface of the porous carbon material, thereby solving the problem of deterioration of the lifetime of the lithium secondary battery due to depletion of the electrolyte solution, thereby improving the lifetime characteristics of the lithium secondary battery and improving the reactivity.

Hereinafter, preferred examples are provided to help understanding of the present invention, but the following examples are merely illustrative of the present invention, and it is apparent to those skilled in the art that various changes and modifications can be made within the scope and technical spirit of the present invention, and it is natural that such changes and modifications belong to the appended claims.

<Preparation of Sulfur-Carbon Composite>

Example 1

To poly(3,4-ethylenedioxythiophene) polystyrene sulfonate (PEDOT:PSS) (Clevios™ from Heraeus), sulfuric acid ($H_2SO_4$) was dropped dropwisely, and thus the surface of PEDOT:PSS was doped with sulfuric acid.

The pH of PEDOT:PSS doped with sulfuric acid was 6-7.

In order to make the coating easier, ethanol was added to the aqueous solution of PEDOT:PSS doped with sulfuric acid and to prepare a PEDOT:PSS coating solution. Carbon nanotubes were added to the coating solution and stirred to prepare carbon nanotubes coated with PEDOT:PSS doped with sulfuric acid.

At this time, PEDOT:PSS doped with sulfuric acid was coated so that its amount is 2 parts by weight based on 100 parts by weight of carbon nanotubes.

After uniformly mixing the carbon nanotubes coated with PEDOT:PSS doped with sulfuric acid and sulfur, heat treatment was performed at 155° C. for 30 minutes to prepare sulfur-carbon composite. The weight ratio of the carbon nanotubes coated with PEDOT:PSS doped with sulfuric acid and sulfur was 8:2.

Example 2

A sulfur-carbon composite was prepared in the same manner as in Example 1, except that para-toluene sulfonic acid was used instead of sulfuric acid.

Example 3

A sulfur-carbon composite was prepared in the same manner as in Example 1, except that the same procedure as in Example 1 is performed, but the pH of the PEDOT:PSS doped with sulfuric acid is 2.

Example 4

A sulfur-carbon composite was prepared in the same manner as in Example 1, except that the same procedure as in Example 1 is performed, but the pH of the PEDOT:PSS doped with sulfuric acid is 5.

Comparative Example 1

After uniformly mixing the carbon nanotubes and sulfur, heat treatment was performed at 155° C. for 30 minutes to prepare a sulfur-carbon composite.

Comparative Example 2

A sulfur-carbon composite was prepared in the same manner as in Example 1, except that sulfuric acid is not used.

Comparative Example 3

After uniformly mixing the carbon nanotubes and sulfur, heat treatment was performed at 155° C. for 30 minutes to prepare a sulfur-carbon composite. Thereafter, PEDOT:PSS was coated on the surface of sulfur-carbon composite, and at this time, PEDOT:PSS was coated in an amount of 2 parts by weight based on 100 parts by weight of sulfur-carbon composite to prepare a sulfur-carbon composite.

Comparative Example 4

Polyethylene glycol (PEO) was coated on the surface of the carbon nanotubes, and at this time, PEO was coated in an amount of 2 parts by weight based on 100 parts by weight of the carbon nanotubes.

After uniformly mixing the carbon nanotubes coated with PEO and sulfur, heat treatment was performed at 155° C. for 30 minutes to prepare a sulfur-carbon composite, The weight ratio of sulfur and carbon nanotubes coated with PEO was 8:2.

Experimental Example 1

Measurement of Decomposition of Electrolyte Solution of Positive Electrode for Lithium-Sulfur Battery Each positive electrode for a lithium-sulfur battery was prepared by using the sulfur-carbon composites prepared in Comparative Examples 1, 2, and 4 as a positive electrode active material.

A slurry was prepared by mixing a sulfur-carbon composite, an electrically conductive material, and a binder in a weight ratio of sulfur-carbon composite:electrically conductive material:binder of 90:5:5, and then coated on a current collector of an aluminum foil having a thickness of 20 μm to manufacture an electrode. At this time, carbon black was used as an electrically conductive material, and styrene-butadiene rubber and carboxymethyl cellulose were used as the binder. Subsequently, a positive electrode was manufactured by drying in an oven at 50° C. overnight.

Cyclic voltammetry was performed to observe the decomposition of the electrolyte solution of the sulfur-carbon composite. When a voltage between 1.0 and 2.0V was applied while changing the scan rate within 20 to 200 mV/s, the current value measured at the working electrode was recorded, and the results are shown in FIG. 1.

From the above results, it can be seen that in the case of Comparative Example 1 which uses the sulfur-carbon composite prepared using carbon nanotube without a thiophene-based polymer, decomposition of the electrolyte solution was occurred.

It was confirmed that in the case of Comparative Example 2 using sulfur-carbon composite containing carbon nanotubes coated with PEDOT:PSS, the potential band and its width were greatly reduced, and from this, it can be seen that the decomposition of the electrolyte solution can be prevented.

In addition, it can be seen that the sulfur-carbon composite containing the carbon nanotubes coated with PEO prepared in Comparative Example 4 prevented the decomposition of the electrolyte solution as compared to Comparative Example 1, but did not prevent the decomposition of the electrolyte solution as compared to Comparative Example 2.

Experimental Example 2

Measurement of Lifetime Characteristics of Lithium-Sulfur Battery

Each lithium-sulfur battery was manufactured using the sulfur-carbon composites prepared in Examples 1 to 4 and Comparative Examples 1 to 3 as a positive electrode active material.

A slurry was prepared by mixing a sulfur-carbon composite, an electrically conductive material, and a binder in a weight ratio of sulfur-carbon composite:electrically conductive material:binder of 90:5:5, and then coated on a current collector of an aluminum foil having a thickness of 20 μm to manufacture an electrode. At this time, carbon black was used as an electrically conductive material, and styrene-butadiene rubber and carboxymethyl cellulose were used as the binder. Subsequently, a positive electrode was manufactured by drying in an oven at 50° C. overnight.

A coin cell was manufactured using the electrode manufactured above as a positive electrode, polyethylene as a separator, and lithium foil having a thickness of 45 μm as a negative electrode. At this time, the coin cell used an electrolyte prepared by dissolving 1 M LiTFSI, 3% by weight of $LiNO_3$ in an organic solvent composed of a DOL/DME solvent (1:1 volume ratio). Here, DOL means dioxolane and DME means dimethoxyethane.

Lifetime characteristics were measured by performing charging/discharging at 0.1C/0.1C during the initial 3 cycles, and performing charging/discharging at 0.2C/0.2C during 3 cycles, and then repeating charging/discharging at 0.3C/0.5C using a charging/discharging measurement device.

In the case of Comparative Example 4, it was not easy to manufacture a lithium-sulfur battery due to the problem that the sulfur-carbon composite is detached by the occurrence of cracks in the electrode.

In the results of Example 1, Example 2, Comparative Example 1 and Comparative Example 2 (FIG. 2), it was confirmed that the sulfur-carbon composite containing the carbon nanotubes coated with PEDOT:PSS prepared in Comparative Example 2 has superior reactivity and improved lifetime characteristics as compared to the sulfur-carbon composite of Comparative Example 1. Therefore, it was found that coating the porous carbon material with PEDOT:PSS improves lifetime characteristics and reactivity of a lithium-sulfur battery.

The sulfur-carbon composite containing carbon nanotubes coated with PEDOT:PSS doped with sulfuric acid prepared in Example 1 showed higher reactivity than the sulfur-carbon composite containing carbon nanotubes coated with PEDOT:PSS doped with para-toluene sulfonic acid prepared in Example 2. From this, it was found that sulfuric acid is most preferable as the dopant.

In addition, Example 1 had excellent reactivity and lifetime characteristics compared to Comparative Examples 1 and 2, and Example 2 was superior to Comparative Example 1, but showed the results of reactivity and lifetime characteristics similar to Comparative Example 2.

However, from the results of the initial reactive sections of Example 1, Example 2, Comparative Example 1 and Comparative Example 2 (FIG. 3), it was confirmed that Example 1 and Example 2 had better reactivity than Comparative Example 1 and Comparative Example 2.

In addition, in the evaluation of lifetime characteristics in the high-rate section of Example 2 and Comparative Example 2 (FIG. 4), Example 2 showed better lifetime characteristics than Comparative Example 2.

Therefore, it can be seen that the sulfur-carbon composite containing carbon nanotubes coated with PEDOT:PSS doped with a dopant has excellent reactivity and lifetime characteristics.

In the results of Example 3, Example 4, Comparative Example 1 and Comparative Example 3 (FIG. 5), Comparative Example 3 in which the surface of sulfur-carbon composite was coated with PEDOT:PSS showed the result of very poor lifetime characteristics. Example 3, in which the pH of PEDOT:PSS doped with sulfuric acid is 2, and the sulfur-carbon composite is prepared using carbon nanotubes coated with this, had better lifetime characteristics compared to Comparative Example 1 and Comparative Example 3. Example 4, in which the pH of PEDOT:PSS doped with sulfuric acid is 5, and the sulfur-carbon composite is prepared using carbon nanotubes coated with this, showed excellent reactivity and lifetime characteristics compared to Example 3.

Therefore, it was found that it is most preferable that the pH of PEDOT:PSS doped with sulfuric acid is 5.

The present invention relates to sulfur-carbon composite containing a porous carbon material coated with a thiophene-based polymer doped with a dopant and sulfur, which can prevent the decomposition of the electrolyte solution by the above coating, thereby improving the reactivity and lifetime characteristics of the lithium-sulfur battery containing the same.

The invention claimed is:

1. A sulfur-carbon composite, comprising:
a porous carbon material; and
sulfur present in at least a portion of an interior and a surface of the porous carbon material;
wherein the porous carbon material is coated with a thiophene-based polymer doped with a dopant prior to mixing with sulfur,
wherein a pH of the thiophene-based polymer doped with the dopant is 4 to 7, and
wherein the thiophene-based polymer doped with a dopant is not coated on the surface of sulfur.

2. The sulfur-carbon composite according to claim 1, wherein the thiophene-based polymer comprises at least one selected from the group consisting of poly(3,4-ethylenedioxythiophene) polystyrene sulfonate and poly(3-hexylthiophene).

3. The sulfur-carbon composite according to claim 1, wherein the dopant comprises at least one selected from the group consisting of sulfuric acid, para-toluene sulfonic acid, perchloric acid, hydrochloric acid, fluoroboric acid and phosphoric acid.

4. The sulfur-carbon composite according to claim 1, wherein the dopant is present in an amount of 0.01 to 10 parts by weight based on 100 parts by weight of the thiophene-based polymer.

5. The sulfur-carbon composite according to claim 1, wherein the porous carbon material comprises at least one selected from the group consisting of graphite, graphene, carbon black, carbon nanotubes, carbon fiber and activated carbon.

6. The sulfur-carbon composite according to claim 1, wherein the sulfur comprises at least one selected from the group consisting of sulfur ($S_8$), $Li_2S_n$(n≥1), an organic sulfur compound, and a carbon-sulfur polymer [$(C_2S_x)_n$:x=2.5 to 50, n≥2].

7. A method for preparing the sulfur-carbon composite according to claim 1 comprising the steps of:
(a) coating a porous carbon material with a thiophene-based polymer doped with a dopant; and
(b) mixing and molding the coated porous carbon material prepared in step (a) and sulfur.

8. A positive electrode for a lithium secondary battery comprising the sulfur-carbon composite of claim 1.

9. The positive electrode for the lithium secondary battery according to claim 8, wherein the positive electrode for the lithium secondary battery is suitable as a positive electrode for a lithium-sulfur battery.

10. A lithium secondary battery comprising a positive electrode; a negative electrode; a separator interposed between the positive electrode and the negative electrode; and an electrolyte solution, wherein the positive electrode is the positive electrode of claim 8.

11. The lithium secondary battery according to claim 10, wherein the lithium secondary battery is a lithium-sulfur battery.

12. The sulfur-carbon composite according to claim 1, wherein the sulfur-carbon composite is in a form of particles having a diameter of 5 µm to 100 µm.

13. The sulfur-carbon composite according to claim 1, wherein a weight ratio of the sulfur and the porous carbon material coated with the thiophene-based polymer doped with the dopant is 60:40 to 90:10.

* * * * *